United States Patent
De Groot et al.

(10) Patent No.: US 7,564,568 B2
(45) Date of Patent: Jul. 21, 2009

(54) PHASE SHIFTING INTERFEROMETRY WITH MULTIPLE ACCUMULATION

(75) Inventors: Peter De Groot, Middletown, CT (US); Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 11/680,968

(22) Filed: Mar. 1, 2007

(65) Prior Publication Data

US 2007/0206201 A1 Sep. 6, 2007

Related U.S. Application Data

(60) Provisional application No. 60/778,354, filed on Mar. 2, 2006.

(51) Int. Cl.
G01B 11/02 (2006.01)

(52) U.S. Cl. ...................................... 356/511
(58) Field of Classification Search .......... 356/511–514
See application file for complete search history.

(56) References Cited

U.S. PATENT DOCUMENTS

| | | | |
|---|---|---|---|
| 4,594,003 A | | 6/1986 | Sommargren |
| 4,639,139 A * | | 1/1987 | Wyant et al. ............... 356/497 |
| 5,777,741 A * | | 7/1998 | Deck ........................... 356/511 |
| 5,856,667 A | | 1/1999 | Spirig et al. |
| 6,157,660 A | | 12/2000 | Hill et al. |
| 6,236,507 B1 | | 5/2001 | Hill et al. |
| 6,359,692 B1 | | 3/2002 | De Groot |
| 6,992,778 B2 * | | 1/2006 | Nahum ........................ 356/512 |
| 7,259,869 B2 * | | 8/2007 | Hwang et al. ............... 356/511 |
| 7,397,570 B2 * | | 7/2008 | Kawasaki et al. ........... 356/512 |
| 2007/0200943 A1 | | 8/2007 | De Groot |
| 2008/0180679 A1 | | 7/2008 | De Groot |

OTHER PUBLICATIONS

O. Sasaki, H. Okazaki, and M. Sakai, "Sinusoidal phase modulating interferometer using the integrating-bucket method," Appl. Opt. 26, 1089 (1987).
S. Beer et al., "Phase-Sensitive Parallel Optical Coherence Tomography," Microelectronics and Electronics, PhD, vol. 2 (Jul. 2005).
Peter Seitz and Nicolas Blanc, CCD and APS/CMOS technology for smart pixels and image sensors, SPIE, Bellingham, WA, vol. 5251 (2004).

* cited by examiner

*Primary Examiner*—Tarifur Chowdhury
*Assistant Examiner*—Jonathon D. Cook
(74) *Attorney, Agent, or Firm*—Fish & Richardson P.C.

(57) ABSTRACT

An interferometer system is disclosed which is configured to combine measurement light with reference light to form an optical interference pattern, where the interferometer system includes a modulator configured to repetitively introduce a sequence of phase shifts between the measurement and reference light; and a camera system positioned to measure the optical interference pattern, where the camera system is configured to separately accumulate time-integrated images of the optical interference pattern corresponding to the different phase shifts in the sequence during the repetitions of the sequence.

35 Claims, 12 Drawing Sheets

PHASE SHIFTING INTERFEROMETRY WITH MULTIPLE ACCUMULATION

CROSS REFERENCE TO RELATED APPLICATION

Under 35 U.S.C. §119(e) the present application claims priority to U.S. Provisional Patent Application Ser. No. 60/778,354 filed Mar. 2, 2006 and entitled "PHASE SHIFTING INTERFEROMETER SYSTEM WITH CAMERA SYSTEM FEATURING MULTIPLE ACCUMULATORS," the contents of which is incorporated herein by reference.

BACKGROUND

This disclosure relates to phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can, for example, be produced by changing the optical path length from the measurement surface to the interferometer relative to the optical path length from the reference surface to the interferometer. For example, the reference surface can be moved relative to the measurement surface or a modulator may be placed in one of the beam paths. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

The interference signal in a PSI system is typically detected by a camera system, converted to electronic data, and read out to a computer for analysis. In conventional applications, the optical interference signal is imaged onto an array of pixels. Charge accumulates at each pixel at a rate that depends on the intensity of the incident light. The charge value at each pixel is then read out, or transferred to a data processing unit.

The rate at which a camera can detect and read out an image is known as the frame rate. The accumulation and read out process can be slow, particularly for detectors with a large number of pixels. Conventional camera frame rates are typically limited to a few hundred Hertz for large-format (e.g., 1 Mega Pixel) cameras.

Such conventional PSI systems are, consequently, limited to phase shift rates less than the camera frame rate. When the phase of a PSI system is shifted faster than the frame rate, the camera system will integrate together interference patters with multiple phase values, making the measurement of an interference pattern at a distinct phase values impossible. Unfortunately, a PSI system operating at a relatively low phase shift rate is highly susceptible to noise. The fact that the measurement requires time means that other time-dependent phenomena, such as mechanical vibrations, tend to be convolved into the data, resulting in measurement errors.

SUMMARY

In one aspect, an interferometer system is disclosed which is configured to combine measurement light with reference light to form an optical interference pattern, where the interferometer system includes a modulator configured to repetitively introduce a sequence of phase shifts between the measurement and reference light; and a camera system positioned to measure the optical interference pattern, where the camera system is configured to separately accumulate time-integrated images of the optical interference pattern corresponding to the different phase shifts in the sequence during the repetitions of the sequence. In some embodiments, the repetition rate for the repetition of the sequence of phase shifts is greater than 1 kHz.

Some embodiments may further include an electronic processor coupled to the camera system and configured to convert the time-integrated images from the camera system into digital information for subsequent processing. In some embodiments, for example, the camera system is configured to send the time-integrated images to the electronic processor at a rate less than 1 kHz. In some embodiments, the camera system is configured to send the time-integrated images to the electronic processor at a rate less than 500 Hz.

In some embodiments, the camera system accumulates the time-integrated images as electrical charge at different camera pixels.

In some embodiments, the sequence of phase shifts include three or more phase shifts.

In some embodiments, the modulator includes a translation stage configured to adjust the relative path length between the measurement and reference light.

In some embodiments, the interferometer is an unequal path length interferometer. The interferometer further includes a light source for the measurement and reference light, and the modulator is configured to adjust the wavelength output of the light source to introduce the sequence of phase shifts.

In some embodiments, the interferometer further includes a light source for the measurement and reference light. The modulator introduces a heterodyne frequency splitting between orthogonal polarizations of the light source output.

In some embodiments, the modulator is positioned in the path of one of the measurement and reference light and not in the path of the other of the measurement and reference light. In some embodiments, the modulator is, for example, an acousto-optical modulator.

In further embodiments, the interferometry system includes a tilted reference mirror configured to cause the reference and measurement light to focus to different points in the interferometry system prior to reaching the camera system.

In some embodiments, the interferometry system includes, for example, a Twyman Green interferometer or a Fizeau interferometer.

In some embodiments, the camera system includes a camera which has multiple sets of elements. Each set of elements include a light-sensitive pixel and multiple storage cells coupled to the light-sensitive pixels to store electrical information from the light sensitive pixel in accordance with the sequence of phase shifts.

In further embodiments, the camera system includes at least one camera and an optical element positioned in the interferometry system and configured to produce multiple images of the optical interference pattern. In some embodiments, the optical element is positioned in the interferometer system at a system focus. In some embodiments, the optical element includes a diffractive optical element. In some embodiments, the optical element includes a hologram.

In some such embodiments, the camera (or cameras) is positioned to receive the multiple images. The camera system may also include a multi-element shutter to selectively transmit one image and not the other images to the camera (or cameras) in accordance with the sequence of phase shifts. In further embodiments, the camera system further includes a set of differently oriented polarizers. Each polarizer is positioned to receive a corresponding one of the images prior to the camera (or cameras), and the camera system further includes a polarization modulator positioned prior to the optic forming the multiple images and configured to adjust the polarization of the incident light in accordance with the sequence of phase shifts. For example, in some embodiments, the polarization modulator includes a rotating polarization element or an electro-optic modulator.

In yet further embodiments, the camera system includes multiple pixels to accumulate the images frames of the optical interference pattern, and the camera system includes a multi-element shutter to selectively expose some pixels and block other pixels in accordance with the sequence of phase shifts. In some embodiments, for example, the camera system includes multiple cameras, and the multiple pixels are spread among the multiple cameras.

In yet further embodiments, the camera system includes at least one camera and a time-delay element positioned prior to the at least one camera to introduce a time delay with respect to incident light for the time-integrated images along a direction of the at least one camera in accordance with the sequence of phase shifts. In some embodiments the time-delay element is, for example, a mechanical chopper or an electro-optic modulator.

In various embodiments, the repetition rate for the repetition of the sequence of phase shifts is greater than 5 kHz. In further embodiments, the repetition rate for the repetition of the sequence of phase shifts is greater than 10 kHz. In yet further embodiments, the repetition rate for the repetition of the sequence of phase shifts is greater than 100 kHz. In some embodiments, the repetition rate for the repetition of the sequence of phase shifts is greater than that of environmental disturbances for an optical testing station.

In another aspect, an apparatus is disclosed which includes an interferometer system configured to combine measurement light with reference light to form an optical interference pattern. The interferometer system includes a modulator means for repetitively introducing a sequence of phase shifts between the measurement and reference light. The apparatus also includes a camera means for separately accumulating time-integrated images of the optical interference pattern corresponding to the different phase shifts in the sequence during the repetitions of the sequence.

Embodiments may include any of the features or characteristics found in the various embodiments described above.

In yet another aspect, a method is disclosed which includes combining measurement light with reference light to form an optical interference pattern; repetitively introducing a sequence of phase shifts between the measurement and reference light; and separately accumulating time-integrated images of the optical interference pattern in a camera system, wherein the time-integrated images correspond to the different phase shifts in the sequence during the repetitions of the sequence. In some embodiments, the sequence of phase shifts are repetitively introduced at a rate greater than 1 kHz.

Embodiments of the method may include any of the features or characteristics found in the various embodiments described above.

As used herein, "light" and "optical" does not only refer to visible electromagnetic radiation; rather such terms include electromagnetic radiation in any of the ultraviolet, visible, near-infrared, and infrared spectral regions.

Unless otherwise defined, all technical and scientific terms used herein have the same meaning as commonly understood by one of ordinary skill in the art to which this disclosure belongs. In case of conflict with any document incorporated by reference, the present disclosure controls.

Other features, objects, and advantages will be apparent from the following detailed description.

DESCRIPTION OF DRAWINGS

Like reference numerals in different drawings refer to common elements.

DETAILED DESCRIPTION

Figure 1:
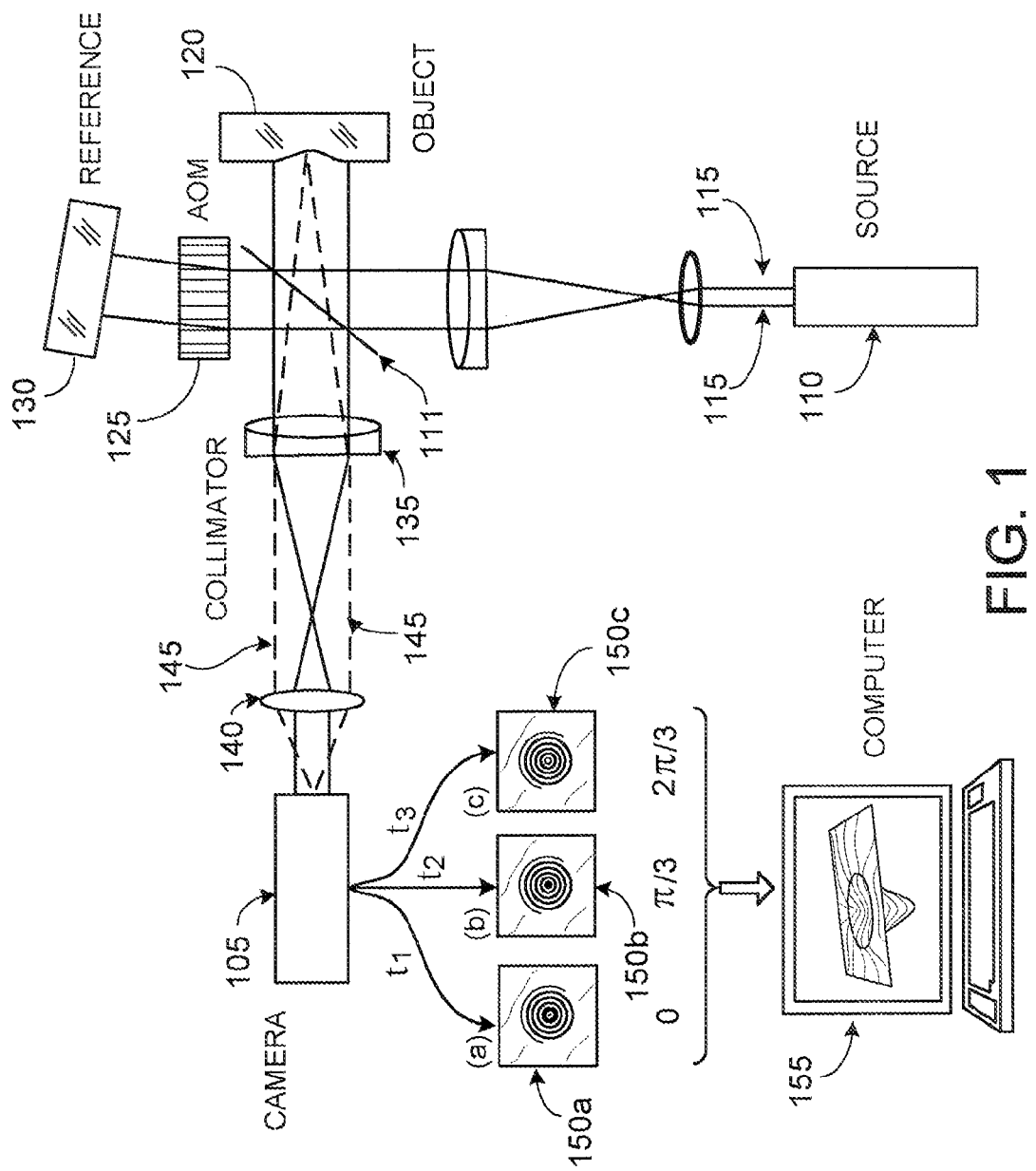
FIG. 1 shows an embodiment of a phase shifting interferometer system featuring the Twyman-Green configuration.

In some embodiments, an interferometer system is disclosed that features a phase shifting interferometer which produces a series of phase shifted interference pattern images, and a camera system that captures, integrates, and stores the multiple phase shifted images of the interference pattern. The camera system captures snapshots of the rapidly phase shifted images and adds them in separated accumulation areas so as to obtain two or more time-integrated images of the interference pattern at specific phase values. The system enables interferometry with phase shifts that occur rapidly compared to conventional camera frame rates, thereby significantly reducing sensitivity to environmental effects.

In various embodiments, the interferometer includes a light source in an imaging interferometer geometry such as a laser Fizeau, Twyman Green, point diffraction interferometer or the like, arranged so that the phase of reference light reflected from a reference surface is shifted with respect to the phase of measurement light from an object surface. The rate at which the phase between the measurement and reference light is shifted is known as the phase shift frequency of the interferometer system. For example, if the phase shifting scans through a sequence of three phase shifts (in a $2\pi$ cycle), the rate at which that sequence of three phase shifts repeats is the phase shift frequency. In some embodiments, the phase shift frequency is selected to be higher than the frequency of environmental noise and other disturbances (e.g., vibrations) that modulate the interference pattern in an undesirable way. Typically, the frequency of such disturbances is less than 1 kHz. The magnitude of such disturbances decays rapidly beyond 1 kHz.

Accordingly, embodiments of the phase shifting interferometer disclosed herein include a phase modulation component for rapid phase shifting, e.g., phase shifting frequencies greater than 1 kHz, and preferably greater than 5 kHz or even 10 kHz, and up to several megahertz.

Disclosed embodiments of the system also include a camera system which includes an imaging detector such as a camera or combination of cameras, configured so as to continuously capture and separate image data into two or more distinguishable accumulators, such as separate camera frame buffers, separate cameras or separate areas or pixels on the same camera. Each accumulator contains integrated data corresponding to a specific phase value or range of phase values captured repeatedly as the phase between the reference and measurement beams is shifted. After an integration time, the integrated values from the accumulators are transferred to computer or other data processor to determine a property (e.g. surface height profile) of, for example, an object surface or wavefront under test. Such transfers take place at a frame rate that is typically less than 1 kHz, or even less than 500 Hz, for example, at a few hundred hertz, such as is common in conventional cameras.

We will first present several embodiments of interferometer systems utilizing various types of phase shifting interferometers. We will then describe several embodiments of camera systems suitable for use in the interferometer systems.

FIG. 1 illustrates a phase shifting interferometer system 100 employing a camera system 105 for capturing the phase shifted interference images at high speed and integrating them in separate accumulators based on time sequencing. This particular embodiment features a phase shifting interferometer in the Twyman-Green configuration. A substantially monochromatic light source 110 (e.g. a laser diode) produces a source beam which is collimated and directed to a beam splitter 111. The chief rays 115 of the beam are indicated with unbroken lines. The beam splitter 111 divides the source beam into a measurement beam, and a reference beam. The measurement beam impinges on the surface of a measurement object 120 and is reflected. The reference beam passes through an acousto-optic modulator 125 (AOM), or other suitable modulator, and impinges on a reference surface 130 (e.g. a high quality optical flat). The reference beam reflects off of the reference surface 130, and the reflected light passes back through the AOM 125 (acousto-optic modulator). The reference and measurement light is recombined at the beam splitter 111. The combined light is imaged onto a camera system 105 by an imaging system composed of a collimator 135 and final lens 140. The marginal rays 145 of the imaging system are indicated with dashed lines.

The combined light produces an interference pattern of varying intensity on the photosensitive elements (e.g., pixels) of the camera system 105. Spatial variations in the intensity profile of the optical interference pattern correspond to phase differences between the combined measurement and reference wavefronts caused by variations in the profile of the measurement surface relative to the reference surface. The camera system 105 converts the interference pattern to electronic intensity data.

The AOM 125 generates a frequency split $\Delta v$ between the reference and measurement beams. The frequency split causes the relative phase between the measurement and reference beams to shift continuously at a high rate (the phase shifting frequency). This, in turn causes the interference signal at each pixel to cycle from constructive to destructive interference at a high frequency, for example, at 10 kHz up to several MHz.

Such a phase shift frequency may be higher than conventional camera frame rates. Thus, a conventional camera would be unable to make separate measurements of the interference signal at distinct values of the phase shift between the beams. For this reason, the camera system 25 is configured to separately integrate images 150a, 150b, and 150c of the interference pattern at discrete phase shifts. The camera system 125 operates to repeatedly shunt intensity data to separate accumulators at specific times corresponding to a specific portion of a cycle of the phase shift modulation. The embodiment shown in FIG. 1 features three accumulators (not shown), which accumulate interference data for phase values of 0, $\pi/3$, and $2\pi/3$ respectively. Various embodiments of the camera system will be discussed in detail below.

At the end of the integration time the interference data collected by the camera system is read out to a computer 155 and analyzed using methods known in the art in order to produce a surface profile for the measurement object.

Figure 2:
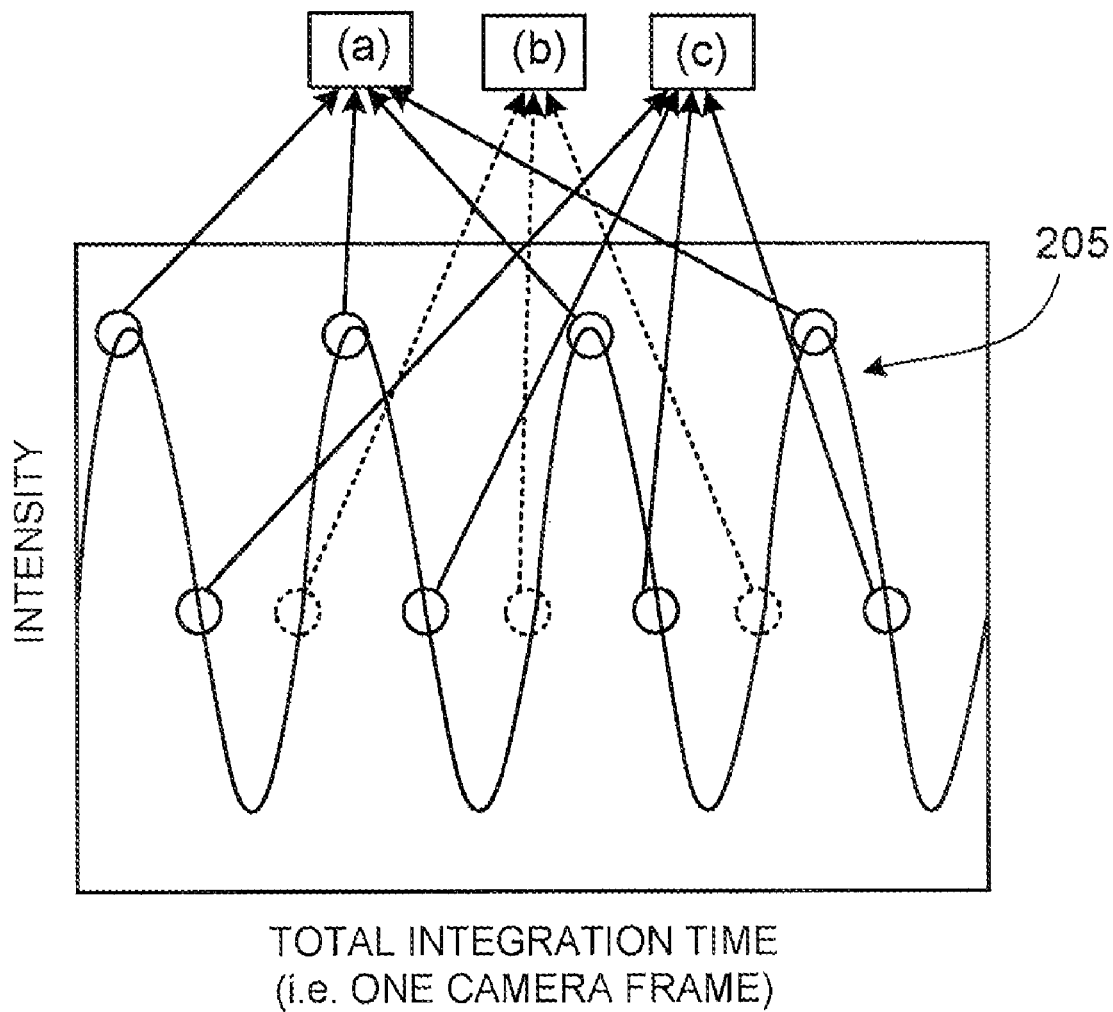
FIG. 2 illustrates the time-dependent distribution of data to three accumulators.

FIG. 2 illustrates an example of the above mentioned time-dependent shunting of intensity data into the three accumulators a, b and c. Intensity data 205 from one pixel of an interference pattern is show. As the relative phase between the interferometer measurement and reference beams is shifted linearly with time, the intensity of the interference signal 205 at the pixel varies sinusoidally, cycling from constructive interference to destructive interference, and back again at the phase shift frequency. For each cycle, the intensity value at each of three distinct phase values is shunted to a separate accumulator a, b, or c. As process is repeated over several cycles, the measured intensity values for each distinct phase value are integrated by the accumulator. After an integration period, the values stored in each accumulator are then read out to a computer or other data processor.

An integration period may be thought of as the inverse of the camera frame rate of an ordinary camera. For example, a 0.02 sec integration time corresponds to a 50 Hz frame rate. However, the phase shift frequency may be very much higher than this, e.g., greater than 1 kHz, or even greater than 10 kHz and up to several megahertz (such as is possible by using an AOM). Because the phase shift frequency is set to be higher than the frequency of any environmental or other disturbance, the data acquisition is equivalent to a near instantaneous measurement of interference images at multiple phase shifts with a negligible time lag between the images. The integration time (the frame period) need only be short enough to avoid fringe contrast loss for large-amplitude, low-frequency disturbances.

As discussed further below, in various embodiments, the accumulators can be any kind of storage device that integrates intensity data over a specific time. Such devices include electrical, optical (e.g. phosphorescent), or electro-optical storage devices. At the end of this integration time, the accumulators empty their data to a computer, data storage device or other processor and the accumulators are set to zero to begin another integration period.

Figure 3:
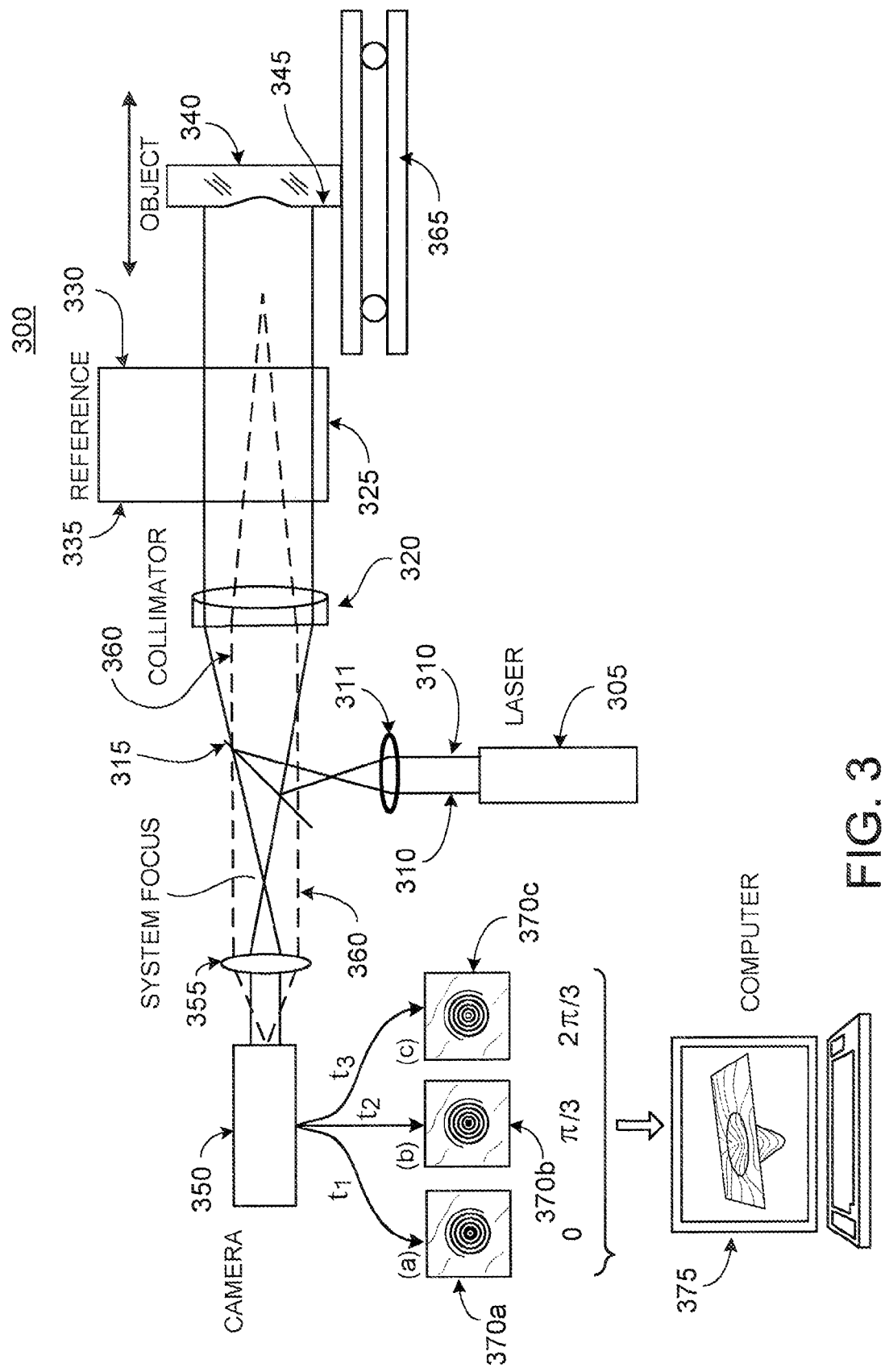
FIG. 3 shows an embodiment of a phase shifting interferometer system featuring a geometry in which the motion of the measurement object generates the phase shift.

FIG. 3 shows an embodiment of a phase shifting interferometer system 300 featuring a Fizeau interferometer geometry. A laser source 305 provides source light. The chief rays 310 of the source light are indicated with unbroken lines. The source light is directed by a lens 311 onto a beam splitter 315, which in turn directs light through a collimator lens 320. The light is then directed onto a partially transparent reference object 325 (e.g., a high quality optical flat, as shown). The back surface of the reference object defines a reference surface 330, while the front surface 335 has an antireflective coating and/or may be tilted with respect to the back surface so that reflections from the front surface do not take part in any subsequent measurements. A portion of the source light is reflected off of the reference surface 330, defining reference light. The remainder of the source light passes through the reference object 325 and is directed to measurement object 340. Light reflects off of the surface 345 of the measurement object, defining measurement light. The measurement light passes back through the reference object 325 to recombine with the reference light. The combined light is imaged onto a camera system 350 by an imaging system composed of a collimator 320 and final lens 355. The marginal rays 360 of the imaging system are shown as dashed lines.

As in the embodiment above, the combined light produces an interference pattern of varying intensity on the photosensitive elements, pixels, of the camera system 350. Spatial variations in the intensity profile of the optical interference pattern correspond to phase differences between the combined measurement and reference wavefronts caused by variations in the profile of the measurement surface relative to the reference surface. The camera system 350 converts the interference pattern to electronic intensity data.

In the present embodiment, the relative phase between the measurement and reference light is shifted by repetitively scanning the position of the measurement object 340 along one direction. The measurement object is mounted on mechanical stage 365 (e.g. a piezo-electric transducer stage) which allows the measurement object 340 to be moved continuously towards or away from the reference object 325. Thus, the optical path difference between the reference and measurement beams is be varied, and the interference signal at each pixel of the camera system 350 cycles from constructive to destructive interference and back again at a phase shift frequency which depends on the speed of the object motion.

As described above, the phase shift frequency generated by the object motion is typically higher than conventional camera frame rates. Therefore, a camera system 350 is used, as described above, to accumulate interference data 370a, 370b, and 370c at multiple (as shown, three) distinct phase values (0, $\pi/3$, $2\pi 3$) for an integration time. At the end of the integration time the interference data is read out to a computer 375 and analyzed using methods known in the art in order to produce a surface profile for the measurement object.

Figure 4:
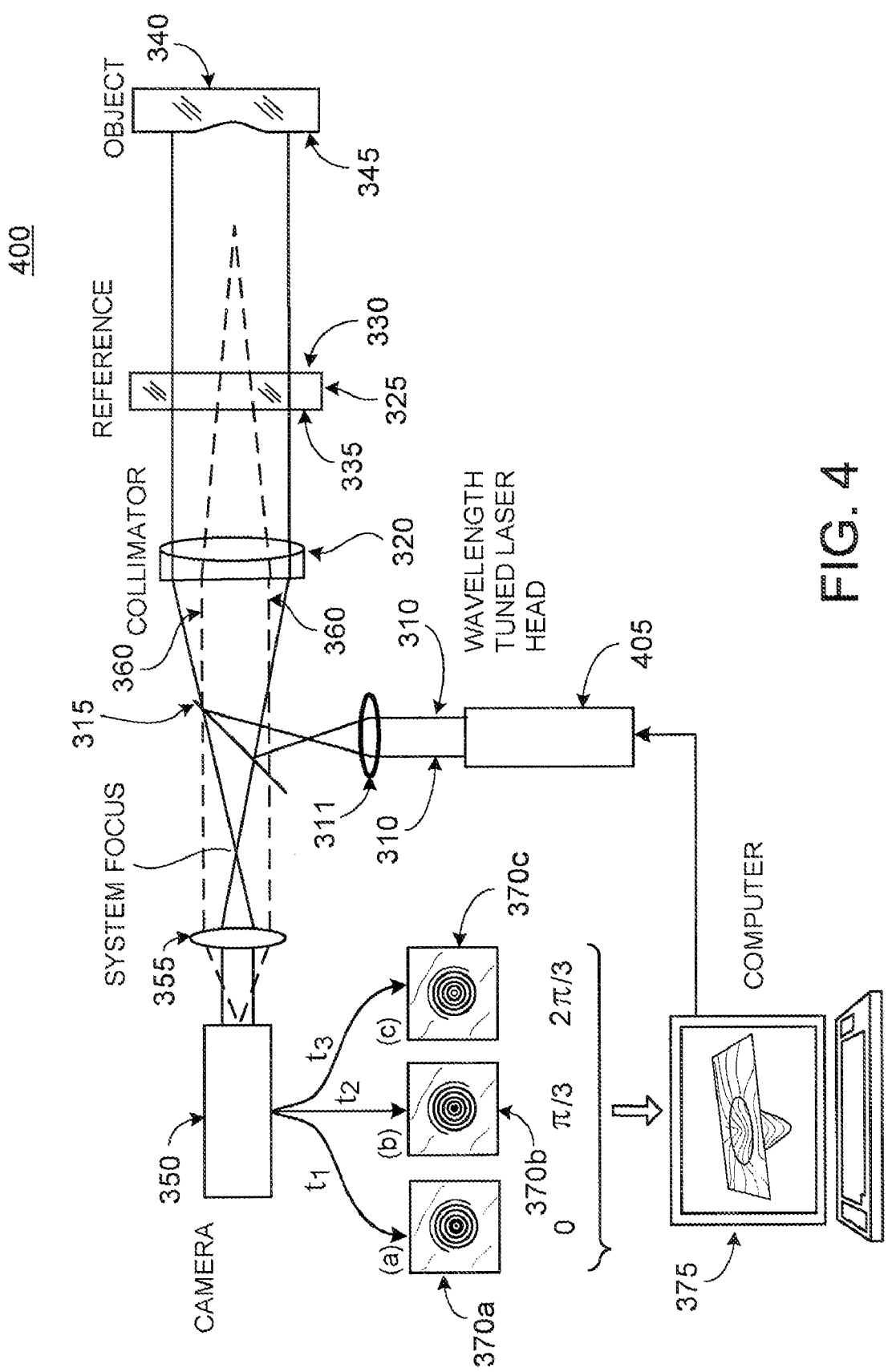
FIG. 4 shows an embodiment of a phase shifting interferometer system featuring wavelength tuning.

FIG. 4 shows an embodiment of a phase shifting interferometer system 400 featuring a wavelength tunable light source 405 (e.g., a tunable diode laser) and an unequal path length interferometer. As shown, the interferometer uses a Fizeau geometry as described in previous embodiment. However, the position of the measurement object 340 is not modulated. Instead, the tunable light source 405 is controlled by a driver 375 (e.g. a computer), to provide light of continuously varying wavelength. In this fashion, the relative phase between measurement and reference light is shifted continuously at a phase shift frequency which depends on the rate at which the wavelength of the laser source varied, as described below.

In the Fizeau geometry, the reference and measurement light travel unequal optical path lengths. In general, in an unequal path interferometer, the phase difference between the reference and measurement light depends on both the optical path difference, and the wavelength of the light. Thus, varying the wavelength of the light in time shifts relative phase between the reference and measurement light at a phase shift frequency which depends on both the rate at which the wavelength is varied and the optical path length difference between the reference and measurement light paths. Note that although a Fizeau interferometer is shown, any unequal path length interferometer may be used. Phase-shifting interferometry based on such wavelength tuning is described in, for example, U.S. Pat. No. 6,359,692 entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY" by Peter de Groot, the contents of which are incorporated herein by reference.

In typical applications, the phase shift frequency generated by this type of wavelength tuned interferometer can be much higher than conventional camera frame rates, and much higher than the frequency of environmental noise disturbances. For example, current driven laser diodes can be modulated at rates from 100 kHz to several MHz. As mentioned above, a camera system is used, as described above, to accumulate interference data at multiple (e.g., three) distinct phase values for an integration time. At the end of the integration time the interference data is read out to a computer and analyzed using methods known in the art in order to produce a surface profile for the measurement object 340.

Figure 5:
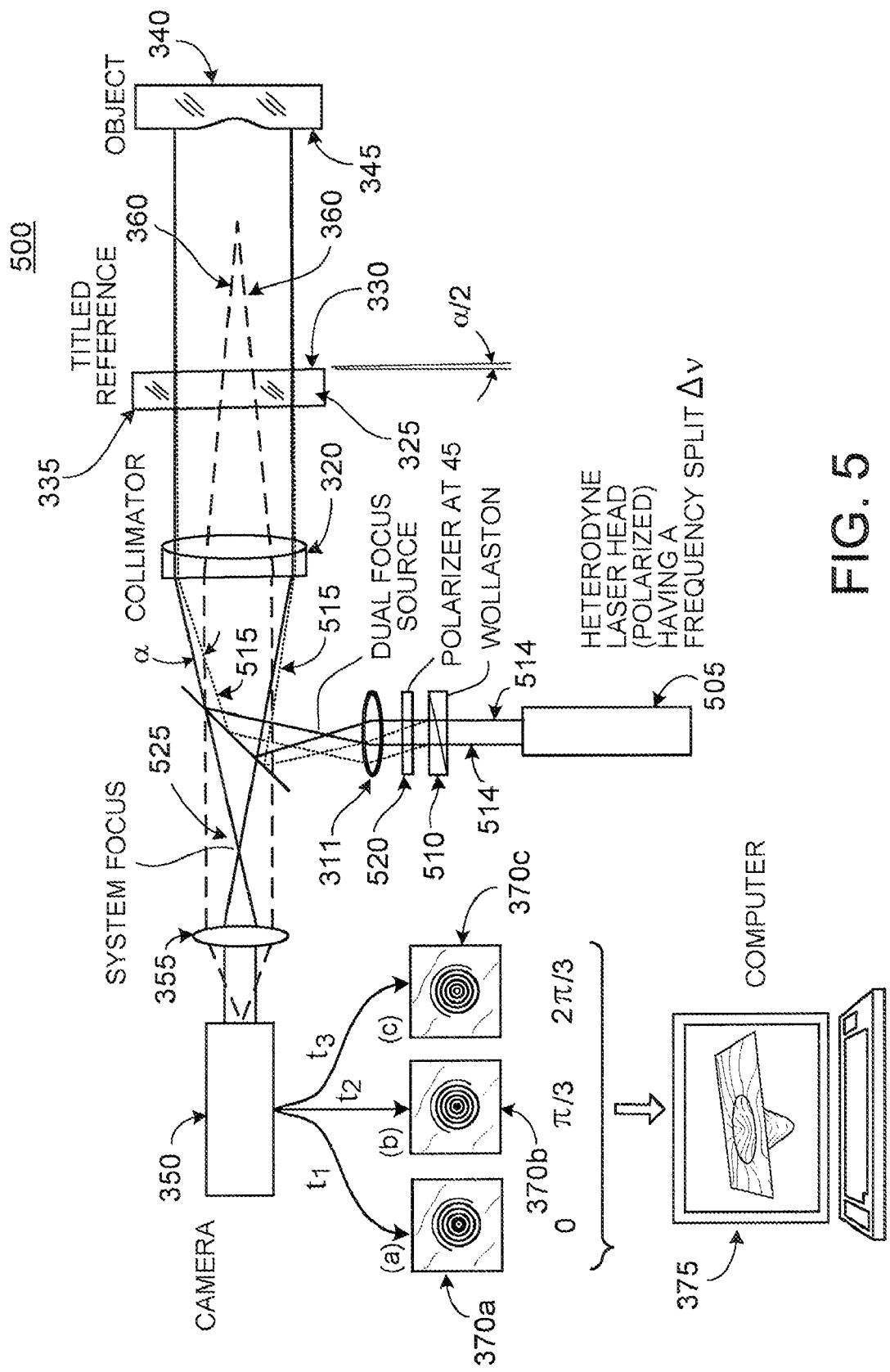
FIG. 5 shows an embodiment of a phase shifting interferometer system in which a polarized heterodyne laser head generates the phase shift.

FIG. 5 shows an embodiment of the phase shifting interferometer system 500 featuring a heterodyne laser source 505 and an interferometer of the Fizeau geometry. The heterodyne laser 505 provides a source beam composed of two orthogonally polarized components which differ in frequency by $\Delta v$. The frequency split may, for example, be accomplished using Zeeman splitting, or an AOM, resulting in phase-shifting rates from, for example, 1 kHz to several MHz. Such heterodyne laser sources are well known in the art, see, for example, U.S. Pat. No. 6,236,507 entitled "APPARATUS TO TRANSFORM TWO NONPARALLEL PROPAGATING OPTICAL BEAM COMPONENTS INTO TWO ORTHOGONALLY POLARIZED BEAM COMPONENTS" by Henry A. Hill et al. and U.S. Pat. No. 6,157,660 entitled "APPARATUS FOR GENERATING LINEARLY-ORTHOGONALLY POLARIZED LIGHT BEAMS" by Henry A. Hill, the contents of both of which are incorporated herein by reference.

Both components of source light are directed onto a Wollaston prism 510. In this specific embodiment, the first component is vertically polarized. The chief rays 514 of this component are indicated by unbroken lines. The second component is horizontally polarized. The chief rays 515 of this component are indicated by dotted lines. The first component passes through the prism 510 undeviated and is directed onto a polarizer 520 oriented at an angle (e.g., 45 degrees) to vertical. This component is then directed through a first lens 311 onto a beam splitter 315. This light is then directed on to a partially transparent reference surface 330. The reference surface 330 has been tilted so that any portion of the first component which reflects off of the reference surface 330 does not take part in any subsequent measurement. The unreflected portion of the first component continues and reflects off of a surface 345 of a measurement object 340, defining a measurement light. The measurement light passes back through the transparent reference 325.

The second component of the source light passes through the prism 510 and is deviated from the first component. This component is also directed onto the polarizer 520 oriented at an angle (e.g., 45 degrees) to vertical, such that after the polarizer 520 both components have the same polarization. The portion of the first component which passes through the polarizer is then directed through a first lens 311 onto a beam splitter 315. After the beam splitter 315, the path of the second component deviates by an angle α from the path of the first component, as shown. The second component passes through a collimator lens 320 and is directed onto the reference surface 330. The reference surface 330 is tilted at an angle α/2, so that light from the second component which reflects of the reference surface 330 defines a reference light which is realigned with measurement light. The portion of the second component which passes through the reference surface 330 remains misaligned with the measurement light and does not take part in any subsequent measurements.

The aligned reference and measurement light pass back through the collimator lens 320 and are brought to a focus at the system focus 325. A final lens 355 images the combined light onto a camera system 350. The marginal rays 360 of light imaged onto the camera system are indicated with dashed lines.

The measurement light is composed entirely of light from the first component of the source beam, while the reference light is composed entirely of light from the second component of the source beam. Therefore, the measurement and reference light have frequencies which differ by Δν. This frequency split causes a time varying shift of the relative phase between the reference and measurement light. The phase shift frequency depends on the frequency split Δν between the two orthogonally polarized components of the source beam. In typical applications, the phase shift frequency can be much higher than conventional camera frame rates. Therefore, a camera system is 350 used, as described above, to accumulate interference data 370*a*, 370*b*, and 370*c* at multiple (as shown, three) distinct phase values (0, π/3, 2π/3) for an integration time. At the end of the integration time the interference data is read out to a computer 375 and analyzed using methods known in the art in order to produce a surface profile for the measurement object 340.

Although specific polarization orientations for the components of the source beam (i.e. horizontal and vertical) are described in the embodiment above, in other embodiments any other suitable configuration may be used.

Figure 6:
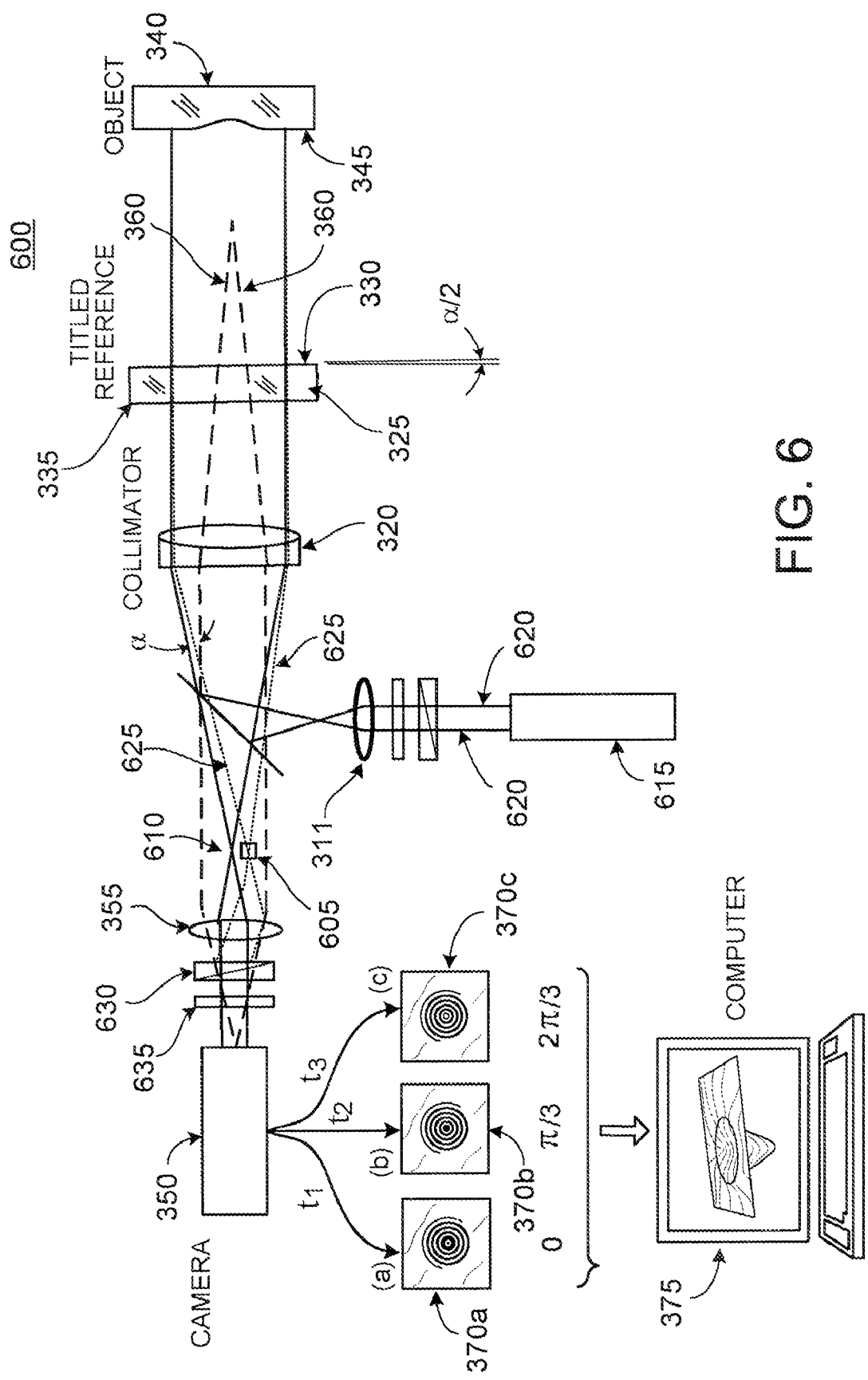
FIG. 6 shows an embodiment of a phase shifting interferometer system incorporating a high-speed modulator at a split system focus.

FIG. 6 shows an embodiment of the phase shifting interferometer system 600 featuring a high speed modulator 605 (e.g., an AOM) and an interferometer of the Fizeau geometry with a split system focus 610. A laser source 615 provides unpolarized source light. The chief rays 620 of the source light are indicated with unbroken lines. The source light is directed onto a beam splitter 315, which in turn directs light through a collimator lens 320. The light is then directed onto a partially transparent reference surface 330 of the type described above. The reference surface 330 is tilted at an angle α/2. A portion of the source beam is reflected off of the reference surface 330, defining reference light. The chief rays 625 of the reference light are indicated with dotted lines. The remainder of the source light passes through the reference object and reflects off of a measurement object, defining measurement light. The measurement light passes back through the reference object 325. The reference and measurement light pass back through the collimator lens 320 and beam splitter 315. At this point, the path of the reference light deviates from the path of the measurement light by an angle α. Therefore, the reference and measurement light focus down to two spatially separated points. This split focus 610 allows a modulator 605 to be placed in the path of the reference light while leaving the measurement light unaffected (or vise versa).

After modulation is applied to the reference light, both the reference and measurement light are collimated by a final lens 355 and directed to a Wollaston prism 630. The Wollaston prism 630 is configured to realign orthogonally polarized components of the measurement and reference light. The aligned light is then polarized by a polarizer 635 aligned at an angle (e.g. 45 degrees) to vertical, and imaged onto a camera system. The marginal rays 360 of light imaged onto the camera system are indicated with dashed lines. Any remaining unaligned portions of the reference and measurement light do not take part in any subsequent measurement. As in the embodiments above, the combined light produces an interference pattern of varying intensity on the photosensitive elements, pixels, of the camera system 350.

The modulator acts 630 on the light passing through it to vary, for example, the optical path length or the frequency of the light. This modulation shifts the relative phase between the reference and measurements light. The modulator may be, for example, an AOM, or EOM (electro-optic modulator). The phase shift frequency depends on the rate of modulation.

In typical applications the modulation can be very fast, providing a phase shift frequency much higher than conventional camera frame rates and higher than that for environmental disturbances. Therefore, a camera system 350 is used, as described above, to accumulate interference data 370*a*, 370*b*, and 370*d* at multiple (e.g., three) distinct phase values (0, π/3, 2π/3) for an integration time. At the end of the integration time the interference data is read out to a computer 375 and analyzed using methods known in the art in order to produce a surface profile for the measurement object.

We will now describe several embodiments of camera systems suitable for use in the phase shifting interferometer systems described above.

Figure 7:
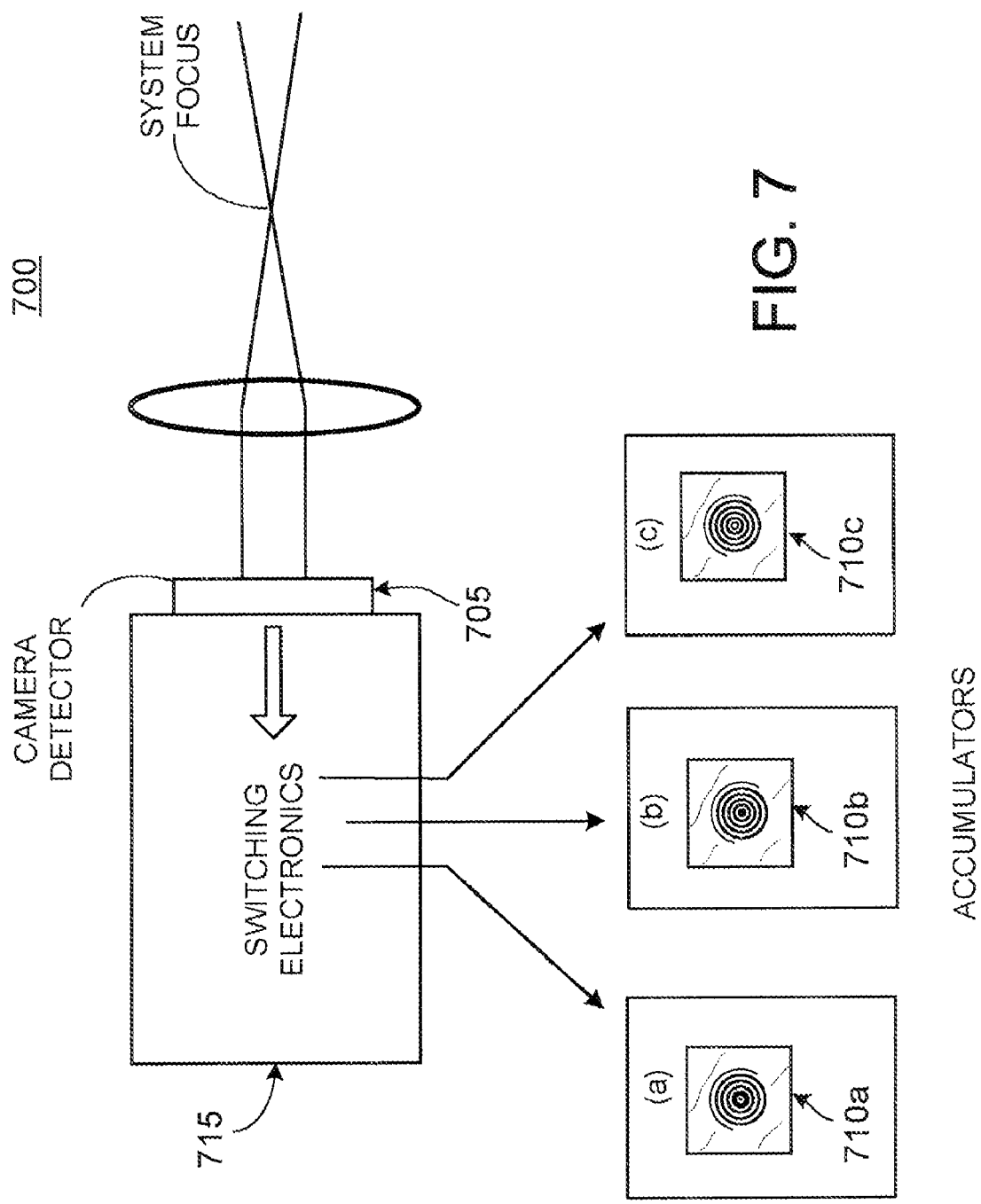
FIG. 7 shows an embodiment of a camera system in which the electrical signal generated by the image on the camera detector is sequenced to three accumulators that integrate the results over time.

FIG. 7 shows a schematic representation of a typical camera system 700 suitable for use in interferometer systems such as those described above. Combined reference and measurement light from a phase shifting interferometer (not shown) is imaged onto the camera detector producing an interference pattern of spatially varying intensity. The camera detector is composed of an array of light sensitive pixels (e.g., photodiodes, charge coupled devices (CCDs), complementary metal oxide semiconductor (CMOS) capacitors, etc.), which convert light intensity to electronic intensity data. The intensity value at each pixel will vary in time as the relative phase between the reference and measurement light is shifted.

The camera system 700 includes accumulators 710a, 710b, and 710c connected to the camera detector by switching electronics 715. The switching electronics are synched to the phase shift frequency of the phase shifting interferometer. Initially, the accumulators are empty. At multiple distinct phase values (e.g., 0, 120, 240 degrees), the intensity values measured by the camera detector pixels are transferred to accumulators 710a, 710b, and 710c respectively. As the phase is shifted further, these phase shift values are reached again, and the related intensity values are again transferred to the appropriate accumulator and added to the previously stored value. This process is repeated for an integration time. The data stored in the accumulators is then read out to a computer or other data processor (not show). In some embodiments, the pixels may themselves function as accumulators.

In various embodiments, more or fewer accumulators may be provided. The system may also be modified to include multiple cameras, each with one or more accumulator that can be switched on and off at high speed. The optics imaging the interferometer signal onto the camera can include multiple elements including various modulators and shutters.

Figure 8:
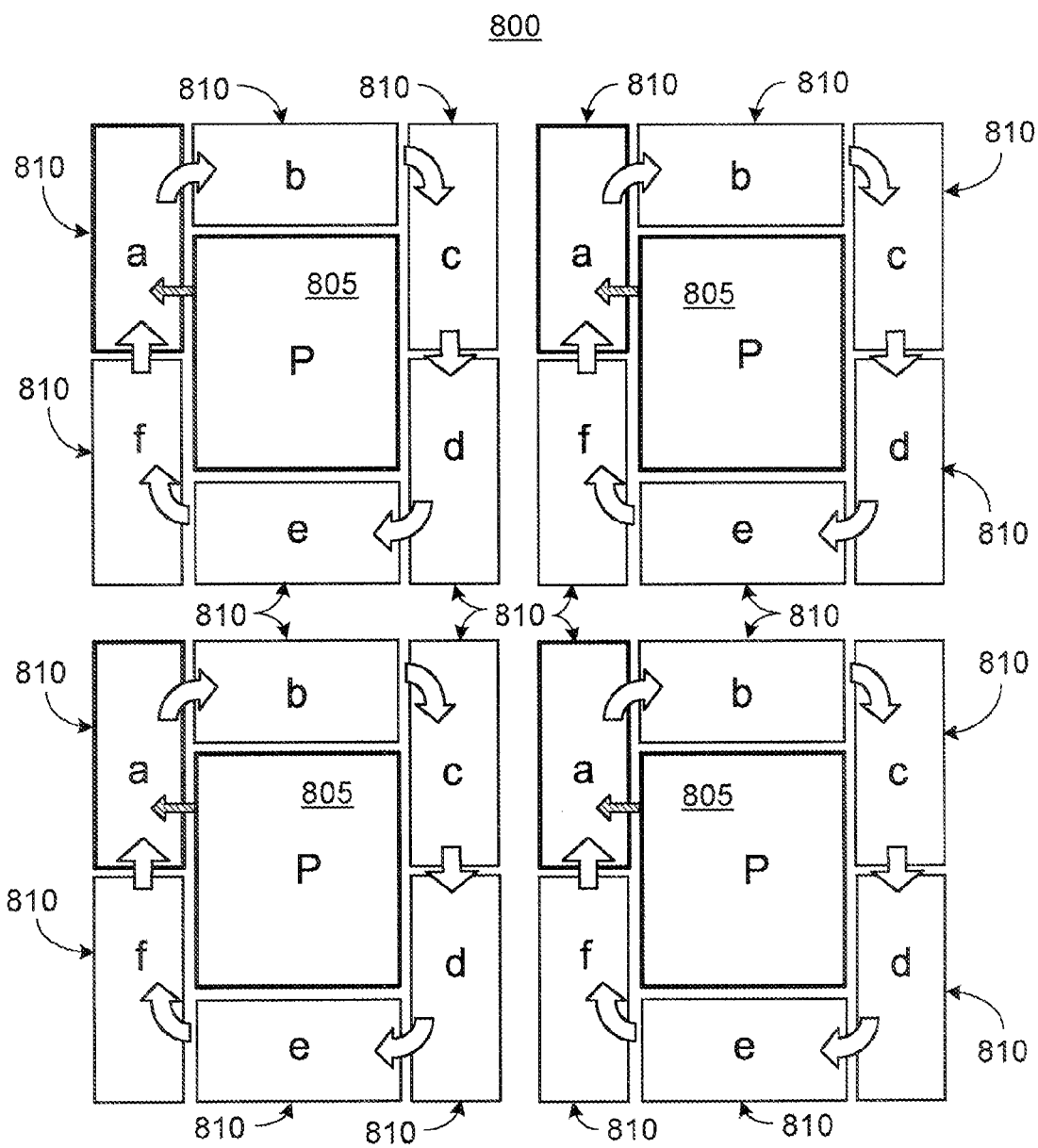
FIG. 8 shows an embodiment of a camera system illustrating how charge transfer can be made between storage areas cyclically.

FIG. 8 shows an embodiment of a camera system 800 featuring four large light sensitive pixels 805 labeled P each coupled to six accumulators 810 labeled a, b, c, d, e, and f. Combined reference and measurement light from a phase shifting interferometer is imaged onto the camera system 800 producing an interference pattern of spatially varying intensity. The large light sensitive pixels 805 produce charge in response to incident light. The amount of charged produced depends on the intensity of the incident light, defining a charge value.

The interferometer signal is modulated by shifting the relative phase between the reference and measurement light. At a distinct phase value the charge value on each pixel 805 is transferred to accumulator a, as shown by the black arrow. The charge values stored in the accumulators 810 are then rapidly transferred in a cyclic fashion, as show by the grey arrows. The charge value stored in accumulator a is transferred to accumulator b, b to c, c to d, d to e, e to f, and f, to a. The process is repeated, storing charge values for related to another phase value. After six repetitions at six different phase values, the system has returned to its original configuration, defining a cycle. The charge value measured at the first phase value is stored in accumulator a, the charge value for the second phase value is stored in accumulator b, and so forth. As the phase modulation continues, the cycle is repeated multiple times, integrating the charge value at each of six distinct phase values into a separate accumulator 810. After an integration time, the integrated charge values are read out to a computer or other data processor.

Suitable embodiments of this type of camera system are described in U.S. Pat. No. 5,856,667 entitled "APPARATUS AND METHOD FOR DETECTION AND DEMODULATION OF AN INTENSITY-MODULATED RADIATION FIELD" by Thomas Spirig et al., and U.S. patent application Ser. No. 11/365,752 entitled "CYCLIC CAMERA" by Peter de Groot et al. and filed Feb. 28, 2006, the contents of both documents being incorporated herein by reference.

Figure 9:
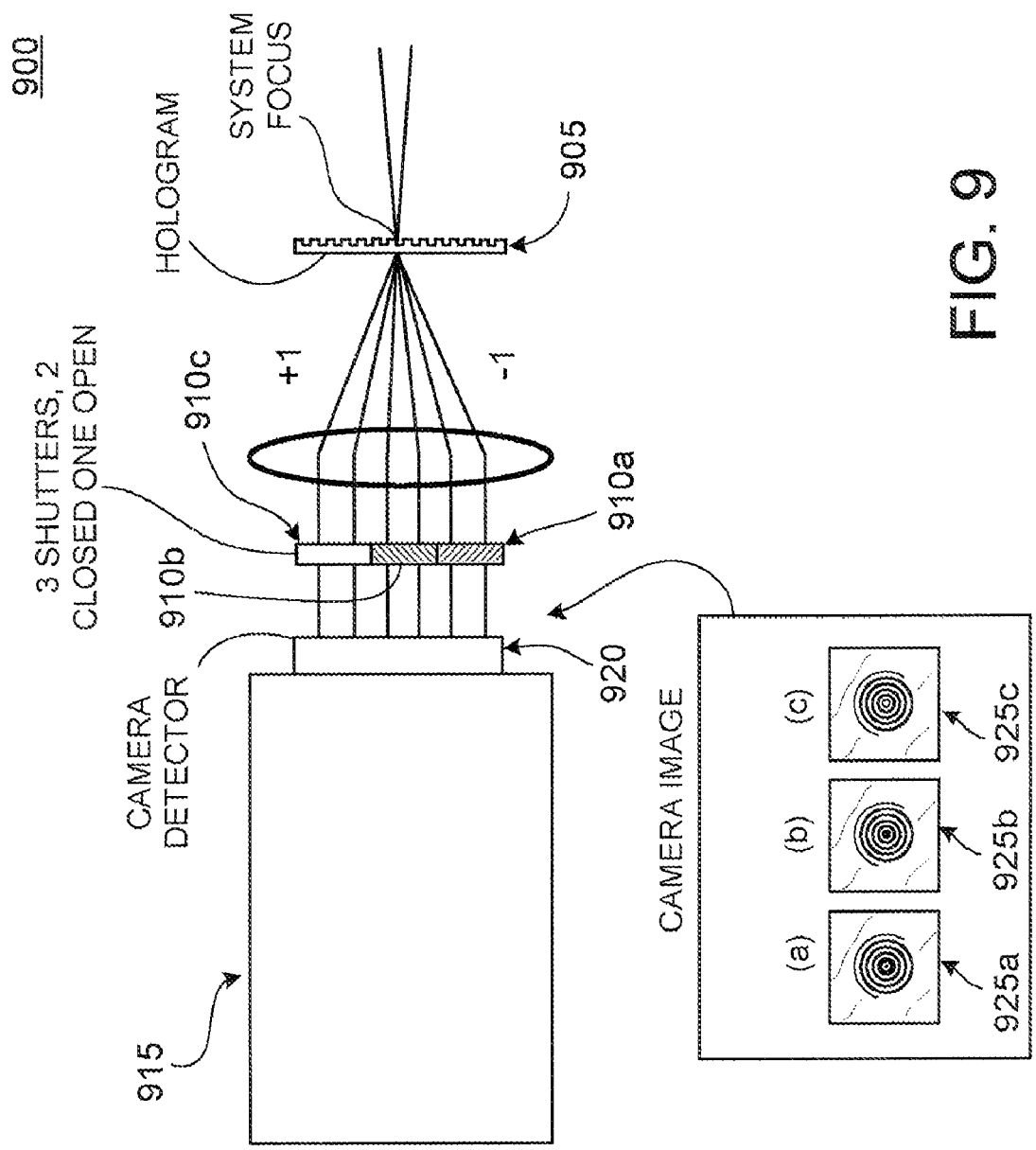
FIG. 9 shows an embodiment of a camera system in which multiple images are projected onto a common detector by means of a hologram or diffraction grating.

FIG. 9 shows another embodiment of a camera system 900. The interference signal from a phase shifting interferometer (not shown) is focused onto a hologram 905 and directed to a camera detector 920 to form an interference pattern. The hologram produces multiple (e.g., three) spatially separated copies of the interference pattern that are imaged onto spatially distinct regions of a camera detector 920. Individually addressable shutters 910a, 910b, and 910c are placed between the hologram and the camera 915. The shutters 910a, 910b, 910c may for, example, include mechanical shutters, spatial light modulators (SLMs) of any suitable type (liquid crystal, electro optical, etc.), micro-electro-mechanical systems (MEMs) of any suitable type, or digital light processors (DLPs) of any suitable type. The shutters 910a, 910b, 910c are arranged to each selectively block one copy of the interference pattern when closed. The shutters are controlled by a control system (not shown) which is synched to the phase shift frequency of the interferometer.

In operation, all three shutters 910a, 910b, and 910c are originally closed. The interferometer phase is modulated, and when a first specific phase value is reached one of the shutters 910a is briefly opened and then closed, exposing a portion of the camera detector 920 to the interference signal. When a second specific phase value is reached, a second shutter 901b opens and closes, exposing a different portion of the camera detector 920 to the interference signal. Finally, when a third specific phase value is reached, a third shutter 910c opens and closes exposing a third portion of the camera detector 920 to the interference signal. In this fashion the camera system provides three spatially distinct "snapshot" images 925a, 925b and 925c of the interference signal at three distinct phase values. As the phase modulation continues, this process is repeated, reinforcing the "snapshot" images 925a, 925b and 925c. After an integration time, the image data is read out to a computer or other data processor. Note that since interference patterns related to distinct phase values are imaged onto separate areas of the camera detector 920, the operation of the camera system is not limited by the camera detector frame rate.

Alternatively, the shutters 910a, 910b, 910c may open for a longer window of time, capturing interference signal data for a range of phase values. In some embodiments, at least one shutter may be open at any given time during the integration time. For example, in the three shutter embodiment shown in FIG. 9, each shutter 910a, 910b, 910c could be controlled to open during different third of each phase modulation cycle.

Various modifications of the above embodiment are possible.

Each copy of the interference pattern could be imaged onto a separate camera. These cameras can be externally shuttered, as described above, or may feature internal electronic shuttering.

The hologram could be replaced by a diffraction grating or refractive optics configured to provided multiple copies of the interference signal.

The shutters could be replaced by a moving hologram or rotating prism synched to the phase shift frequency of the interferometer. These optics can discretely direct the interferometer signal to produce spatially separated interference pattern images for distinct phase values.

While the embodiment shown in FIG. 9 features three spatially separated images 925a, 925b and 925c arranged linearly on the camera detector 920, it is to be understood that any number of images may be arranged in any suitable configuration (e.g. four images arranged in a 2×2 array).

Figure 10:
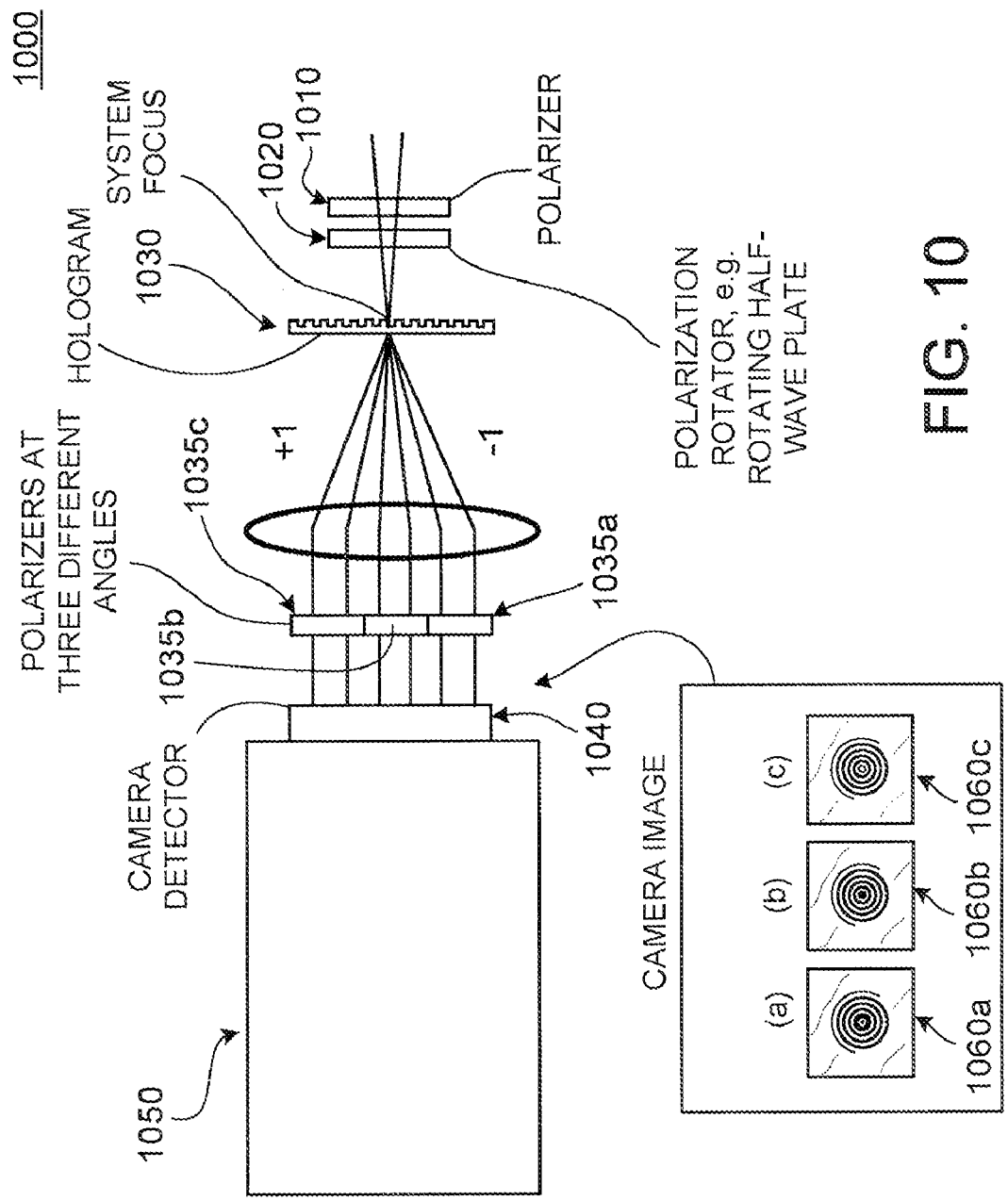
FIG. 10 shows an embodiment of a camera system in which two or more images are projected onto a common detector, with each image passing through its own polarizer.

FIG. 10 shows another embodiment of a camera system 1000. The signal from a phase shifting interferometer passes through a polarizer 1010 and a polarizing rotator 1020 (e.g. a rotating half wave plate) synched to the phase shift frequency. In this fashion, the interference signal is given a polarization that rotates in time. The angle of polarization is directly related to the phase of the interferometer signal.

The interferometer signal is focused on a hologram 1030, and directed to camera detector 1040 to produce multiple, spatially separated copies of the interference pattern as described above. The copies of the pattern are imaged onto spatially distinct regions of the camera detector 1040. Individual polarizers 1035a, 1035b, and 1035c are placed between the hologram and the camera detector 1040, such that one copy of the interferometer signal passes through each polarizer 1035a, 1035b, and 1035c. By disposing the individual polarizers at different angles, copies of the interference signal are effectively shuttered in sequence. Because the phase of the interference signal is directly related to the polarization angle, the camera 1050 captures three spatially distinct "snapshot" images 1060a, 1060b and 1060c of the interference pattern at three distinct phase values. As the phase modulation continues, the polarization angle rotates through 360 degrees multiple times, reinforcing the "snapshot" images. After an integration time, the image data is read out to a computer or other data processor.

Various modifications of the above embodiment are possible.

Each copy of the interference signal could be imaged onto a separate camera. These cameras may additionally feature internal electronic shuttering.

The hologram 1030 could be replaced by a diffraction grating or refractive optics configured to provided multiple copies of the interference signal.

The rotating polarization of the interferometer signal could be provided through electro optic polarization rotation (e.g. liquid crystal devise, Pockell cells, etc) synched to the phase shift frequency. The polarization rotation could also be introduced at locations other than the one shown (e.g., at some point along the interferometer which provides the signal).

Figure 11:
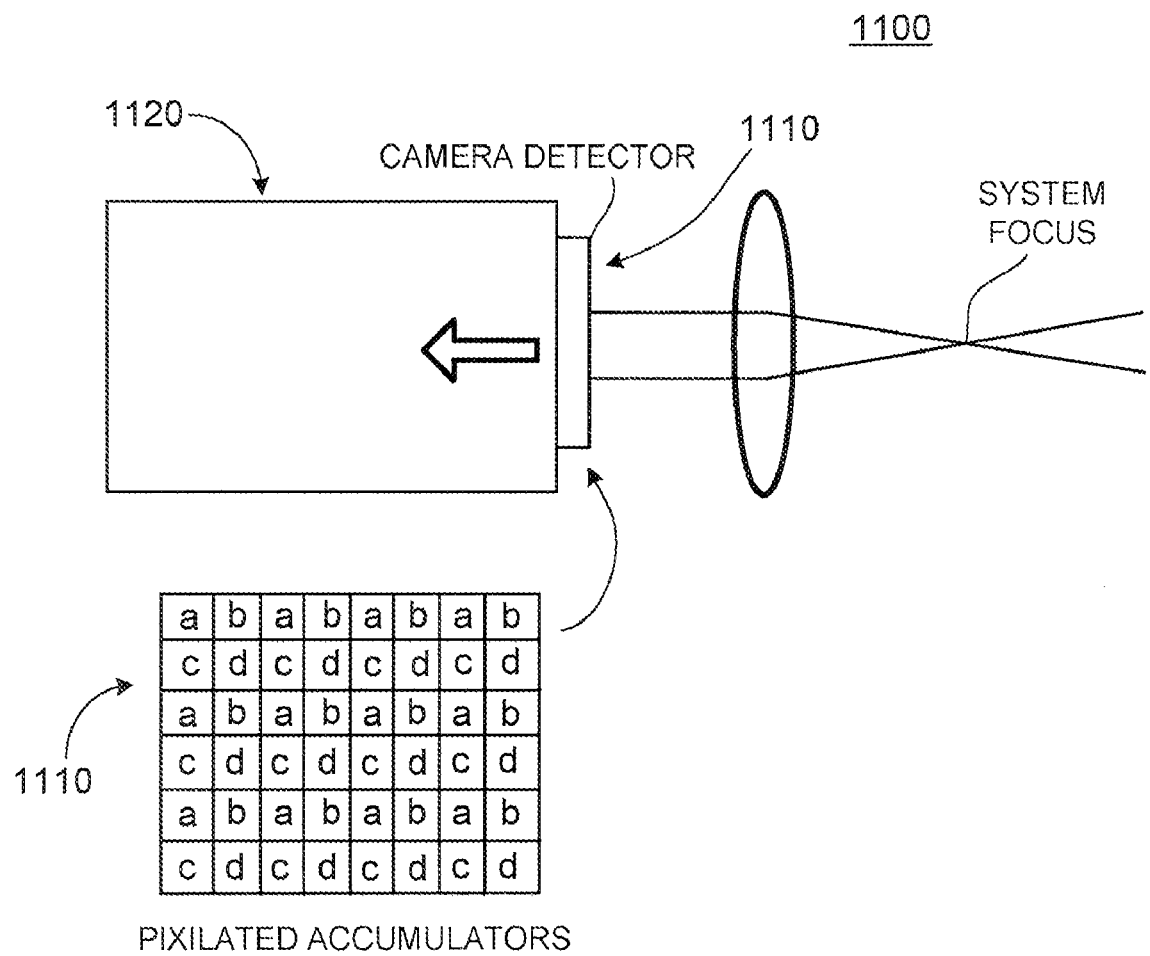
FIG. 11 shows an embodiment of the camera system with pixelated accumulators.

FIG. 11 shows an embodiment of a camera system 1100 that features pixilated accumulators. Combined reference and measurement light from a phase shifting interferometer (not shown) is imaged onto the camera detector 1110 producing an interference pattern of spatially varying intensity. Detector 1110 is made up of multiple, individually shuttered pixels. In the configuration shown, the camera 1120 is capable of accumulating interference patterns for four distinct phase values. Initially, all of the pixels of detector 1110 are shuttered using any one of the methods described above. When a first phase value is reached, the shutters covering pixels labeled "a" briefly open to allow the pixels to accumulate intensity data. When a second, third and fourth phase vale are reached, the shutters labeled "b", "c", and "d" open respectively. In this fashion the camera system provides four interlaced "snapshot" images of the interference pattern at four distinct phase values. As the phase modulation continues, this process is repeated, reinforcing the "snapshot" images. After an integration time, the image data is read out to a computer or other data processor.

In some embodiments, the shutters may open for a longer window of time, capturing interference signal data for a range of phase values. In some embodiments, the shutters covering at least one set of pixels may be open at any given time during the integration time. For example, in the embodiment shown in FIG. 11, the shutters covering pixels labeled "a" could be configured to open for the first quarter of each phase modulation cycle, while the shutters covering pixels labeled "b" open for the second quarter of the cycle, and so forth.

Various modifications of the above embodiment are possible.

In some embodiments, instead of shutters, the individual pixels of detector 1110 may be covered with polarizers. For example, in one embodiment, all pixels labeled "a" are covered by a polarizer oriented at a specific angle. All pixels labeled b covered by a polarizer oriented at a different angle, and so forth. As in the embodiment shown in FIG. 10, the interferometer signal is given a rotating polarization synched to the phase shift frequency. In this fashion, the interlaced pixels are exposed to interference pattern images with distinct phase values.

Figure 12:
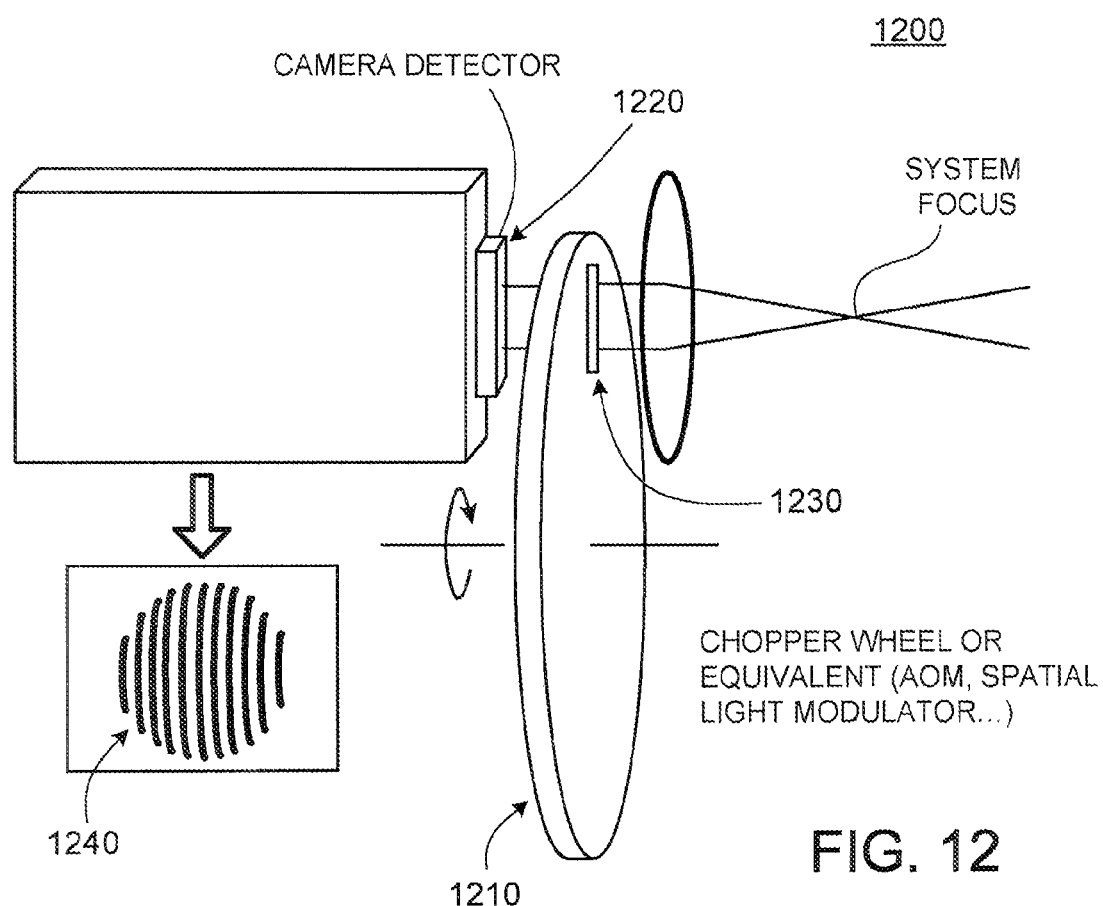
FIG. 12 shows an embodiment of a camera system in which a mechanical chopper creates a time delay along a direction of the detector, resulting in the equivalent of tilt fringes.

In some embodiments, intensity data could be distributed to pixilated accumulators by using an external modulator such as an addressable mirror array (e.g. a MEMs device) or a DLP FIG. 12 shows an embodiment of a camera system 1200 featuring a mechanical chopper wheel 1210. The interferometer signal from a phase shifting interferometer is imaged onto a camera detector 1220. An opaque mechanical chopper wheel 1210 is positioned in front of the camera detector 1220. The chopper wheel includes a narrow slit 1230 oriented along the radius of the wheel 1210 which allows light to pass. As the chopper wheel 1210 is rotated, the slit 1230 is scanned from left to right across the interferometer signal as a function of time. Because the phase of the interferometer signal is varying with time, the phase of the interference pattern image at the detector 1220 will also vary horizontally across the image.

The chopper wheel rotates multiple times, allowing the camera to accumulate intensity data for an integration time. The resulting integrated image 1240 exhibits the equivalent of tilt, or carrier fringes. The density of the fringes depends on the speed of the chopper wheel 1210 and the phase shift frequency. The image is read out to a computer or data processor, and the tilt fringes are analyzed using methods know in the art.

In alternate embodiments the chopper wheel can be replaced by any device which creates a time delay, and thus varying phase, across the interference pattern. Examples include electro-optical devices, AOMs, or spatial light modulators.

A number of embodiments of the invention have been described. Nevertheless, it will be understood that various modifications may be made without departing from the spirit and scope of the invention. For example, the interferometer geometries described in the embodiments above may be replaced by any other suitable geometry including, for example, Twyman-Green, Fizeau, point-diffraction, Michelson, or Mach-Zeder geometries.

Although several embodiments have been shown featuring three accumulators used to integrate interferometer signal values at three distinct phase values, more or fewer accumulators may be used.

The above described interferometer systems may be used to measure various characteristics of a measurement object including, for example, surface profile and texture. In other embodiments, the interferometer system may be used to determine optical wavefront shape or quality. Furthermore, the system can be used on measurement objects with any of plano, spherical, or aspheric geometries.

The system can be used with a various phase shifting techniques and algorithms, including sinusoidal phase shifting, such as that described in O. Sasaki, H. Okazaki, and M. Sakai, "Sinusoidal phase modulating interferometer using the integrating-bucket method," Appl. Opt. 26, 1089 (1987) and U.S. Provisional Patent Application Ser. No. 60/870,453, "SINUSOIDAL PHASE SHIFTING INTERFEROMETRY" by Peter DeGroote the contents of each of which are incorporated herein by reference.

Any of the functions described above in connection with the phase shifting interferometer (e.g., generating a phase shift frequency, controlling one or more modulators, controlling a wavelength tuned light source, etc), the camera (e.g., accumulation or storage of interference pattern data, transfer of data between accumulators, synchronization with a phase shift frequency, control of shutters or other optical elements, etc.), and subsequent data analysis can be implemented in hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention.

What is claimed is:

1. An apparatus comprising:
   an interferometer system configured to combine measurement light with reference light to form an optical interference pattern, the interferometer system comprising a modulator configured to repetitively introduce a sequence of different phase shifts between the measurement and reference light; and
   a camera system positioned to measure the optical interference pattern, wherein the camera system is configured to separately accumulate time-integrated images of the optical interference pattern corresponding to the different phase shifts in the sequence during the repetitions of the sequences
   wherein each of the separately accumulated time-integrated images is integrated for a different one of the different phase shifts over multiple repetitions of the sequence.

2. The apparatus of claim 1, wherein the repetition rate for the repetition of the sequence of phase shifts is greater than 1 kHz.

3. The apparatus of claim 1, further comprising an electronic processor coupled to the camera system and configured to convert the time-integrated images from the camera system into digital information for subsequent processing.

4. The apparatus of claim 3, wherein the camera system is configured to send the time-integrated images to the electronic processor at a rate less than 1 kHz.

5. The apparatus of claim 1, wherein the camera system accumulates the time-integrated images as electrical charge at different camera pixels.

6. The apparatus of claim 1, wherein the sequence of phase shifts comprises three or more phase shifts.

7. The apparatus of claim 1, wherein the modulator comprises a translation stage configured to adjust the relative path length between the measurement and reference light.

8. The apparatus of claim 1, wherein the interferometer is an unequal path length interferometer, wherein the interferometer further comprises a light source for the measurement and reference light, and wherein the modulator is configured to adjust the wavelength output of the light source to introduce the sequence of phase shifts.

9. The apparatus of claim 1, wherein the interferometer further comprises a light source for the measurement and reference light, and wherein the modulator introduces a heterodyne frequency splitting between orthogonal polarizations of the light source output.

10. The apparatus of claim 1, wherein the modulator is positioned in the path of one of the measurement and reference light and not in the path of the other of the measurement and reference light.

11. The apparatus of claim 10, wherein the modulator is an acousto-optical modulator.

12. The apparatus of claim 10, wherein the interferometry system comprises a tilted reference mirror configured to cause the reference and measurement light to focus to different points in the interferometry system prior to reaching the camera system.

13. The apparatus of claim 1, wherein the interferometry system comprises a Twyman Green interferometer or a Fizeau interferometer.

14. The apparatus of claim 1, wherein the camera system comprises a camera having multiple sets of elements, wherein each set of elements comprise a light-sensitive pixel and multiple storage cells coupled to the light-sensitive pixels to store electrical information from the light sensitive pixel in accordance with the sequence of phase shifts.

15. The apparatus of claim 1, wherein the camera system comprises at least one camera and an optical element positioned in the interferometry system and configured to produce multiple images of the optical interference pattern, wherein the at least one camera is positioned to receive the multiple images.

16. The apparatus of claim 15, wherein the camera system further comprises a multi-element shutter to selectively transmit one image and not the other images to the at least one camera in accordance with the sequence of phase shifts.

17. The apparatus of claim 15, wherein the camera system further comprises a set of differently oriented polarizers, wherein each polarizer is positioned to receive a corresponding one of the images prior to the at least one camera, and the camera system further comprises a polarization modulator positioned prior to the optic forming the multiple images and configured to adjust the polarization of the incident light in accordance with the sequence of phase shifts.

18. The apparatus of claim 17, wherein the polarization modulator comprises a rotating polarization element or an electro-optic modulator.

19. The apparatus of claim 15, wherein the optical element is positioned at a system focus of the interferometer system.

20. The apparatus of claim 15, wherein the optical element comprises a diffractive optical element.

21. The apparatus of claim 15, wherein the optical element comprises a hologram.

22. The apparatus of claim 1, wherein the camera system comprises multiple pixels to accumulate the images of the optical interference pattern, and wherein the camera system comprises a multi-element shutter to selectively expose some pixels and block other pixels in accordance with the sequence of phase shifts.

23. The apparatus of claim 22, wherein the camera system comprises multiple cameras, and wherein the multiple pixels are spread among the multiple cameras.

24. The apparatus of claim 1, wherein the camera system comprises at least one camera and a time-delay element positioned prior to the at least one camera to introduce a time delay with respect to incident light for the time-integrated images along a direction of the at least one camera in accordance with the sequence of phase shifts.

25. The apparatus of claim 24, wherein the time-delay element is a mechanical chopper or an electro-optic modulator.

26. The apparatus of claim 1, wherein the repetition rate for the repetition of the sequence of phase shifts is greater than 5 kHz.

27. The apparatus of claim 1, wherein the repetition rate for the repetition of the sequence of phase shifts is greater than 10 kHz.

28. The apparatus of claim 1, wherein the repetition rate for the repetition of the sequence of phase shifts is greater than 100 kHz.

29. The apparatus of claim 1, wherein the repetition rate for the repetition of the sequence of phase shifts is greater than that of environmental disturbances for an optical testing station.

30. The apparatus of claim 3, wherein the camera system is configured to send the time-integrated images to the electronic processor at a rate less than 500 Hz.

31. The apparatus of claim 1, wherein each of the different phase shifts for the sequence is in a range from 0 to $2\pi$.

32. An apparatus comprising:
an interferometer system configured to combine measurement light with reference light to form an optical interference pattern, the interferometer system comprising a modulator means for repetitively introducing a sequence of different phase shifts between the measurement and reference light; and a camera means for separately accumulating time-integrated images of the optical interference pattern corresponding to the different phase shifts in the sequence during the repetitions of the sequence, wherein each of the separately accumulated time-integrated images is integrated for a different one of the different phase shifts over multiple repetitions of the sequence.

33. A method comprising:
combining measurement light with reference light to form an optical interference pattern;
repetitively introducing a sequence of different phase shifts between the measurement and reference light; and
separately accumulating time-integrated images of the optical interference pattern in a camera system, wherein the time-integrated images correspond to the different phase shifts in the sequence during the repetitions of the sequence and each of the separately accumulated time-integrated images is integrated for a different one of the different phase shifts over multiple repetitions of the sequence.

34. The method of claim 33, wherein the phase shifts in the sequence of phase shifts are repetitively introduced at a rate greater than 1 kHz.

35. An apparatus comprising:
an interferometer system configured to combine measurement light with reference light to form an optical interference pattern, the interferometer system comprising a modulator configured to repetitively introduce a sequence of phase shifts between the measurement and reference light; and
a camera system positioned to measure the optical interference pattern, wherein the camera system is configured to separately accumulate time-integrated images of the optical interference pattern corresponding to the different phase shifts in the sequence during the repetitions of the sequence,
wherein the camera system comprises a camera having multiple sets of elements, wherein each set of elements comprise a light-sensitive pixel and multiple storage cells coupled to the light-sensitive pixels to store electrical information from the light sensitive pixel in accordance with the sequence of phase shifts.

* * * * *

UNITED STATES PATENT AND TRADEMARK OFFICE
CERTIFICATE OF CORRECTION

PATENT NO. : 7,564,568 B2  Page 1 of 1
APPLICATION NO. : 11/680968
DATED : July 21, 2009
INVENTOR(S) : Peter J. de Groot It is certified that error appears in the above-identified patent and that said Letters Patent is hereby corrected as shown below:

Column 15, line 53, in claim 1, delete "sequences" and insert --sequence--.

Column 16, line 38, in claim 14, delete "cclls" and insert --cells--.

Signed and Sealed this

Twenty-second Day of September, 2009

David J. Kappos
*Director of the United States Patent and Trademark Office*